(12) United States Patent
Degen et al.

(10) Patent No.: US 7,719,820 B2
(45) Date of Patent: May 18, 2010

(54) ELECTROLYTE SOLUTION FOR DOUBLE-LAYERED CAPACITORS AND DOUBLE-LAYERED CAPACITOR CONTAINING SAID ELECTROLYTE SOLUTION

(75) Inventors: Hans-Georg Degen, Mannheim (DE); Klaus Ebel, Lampertheim (DE); Andree Schwake, Heidenheim (DE); Kristin Tiefensee, Bad Dürkheim/Leistadt (DE)

(73) Assignee: BASF Aktiengesellschaft (DE)

( * ) Notice: Subject to any disclaimer, the term of this patent is extended or adjusted under 35 U.S.C. 154(b) by 444 days.

(21) Appl. No.: 11/659,138

(22) PCT Filed: Aug. 3, 2005

(86) PCT No.: PCT/DE2005/001378
§ 371 (c)(1),
(2), (4) Date: May 18, 2007

(87) PCT Pub. No.: WO2006/012890
PCT Pub. Date: Feb. 9, 2006

(65) Prior Publication Data
US 2008/0089010 A1   Apr. 17, 2008

(30) Foreign Application Priority Data
Aug. 3, 2004   (DE) .................. 10 2004 037 601

(51) Int. Cl.
*H01G 9/00*   (2006.01)
(52) U.S. Cl. .................. 361/502; 361/503; 361/504; 361/508; 361/512; 361/516

(58) Field of Classification Search .............. 361/502, 361/503–504, 508–512, 516–519, 523–541; 252/62.2
See application file for complete search history.

(56) References Cited

U.S. PATENT DOCUMENTS 4,710,310 A   12/1987   Shinozaki et al.
4,821,153 A   4/1989   Kuwae et al.

(Continued)

FOREIGN PATENT DOCUMENTS

CN   1334237 A   2/2002

(Continued)

OTHER PUBLICATIONS

Sing et al, "Reporting Physisorption Data for Gas/Solid Systems with Special Reference to the Determination of Surface Area and Porosity", Pure & Appl. chem., vol. 57, No. 4, pp. 603-619 (1985).

(Continued)

*Primary Examiner*—Nguyen T Ha
(74) *Attorney, Agent, or Firm*—Connolly Bove Lodge & Hutz LLP (57) ABSTRACT

An electrolyte solution proposed for double layer capacitors contains at least one conducting salt comprising a cation having a maximum diameter<9.20 Å which additionally comprises substituents on the central atom which are not all the same and further contains at least one solvent comprising a functional group selected from lactones and nitrites. Such electrolyte solutions are superior to conventional electrolyte solutions at low temperatures when acetonitrile is the solvent, so that double layer capacitors provided with electrolyte solutions according to the invention have improved electrical properties at low temperatures.

20 Claims, 4 Drawing Sheets

U.S. PATENT DOCUMENTS

| | | | |
|---|---|---|---|
| 5,055,974 | A | 10/1991 | Washio et al. |
| 5,177,673 | A | 1/1993 | Nagara et al. |
| 5,418,682 | A * | 5/1995 | Warren et al. ............... 361/502 |
| 6,535,373 | B1 | 3/2003 | Smith et al. |
| 6,728,096 | B1 * | 4/2004 | Smith et al. ................ 361/523 |
| 6,862,167 | B1 * | 3/2005 | Banno et al. ................ 361/502 |
| 6,902,684 | B1 * | 6/2005 | Smith et al. ................ 252/62.2 |

FOREIGN PATENT DOCUMENTS

| | | |
|---|---|---|
| DE | 3750011 | 2/1987 |
| DE | 690 23 780 | 1/1990 |
| DE | 690 16 239 | 4/1990 |
| EP | 1176617 | 1/2002 |
| EP | 1414088 A1 | 4/2004 |
| JP | 63115876 | 5/1988 |
| JP | 2001148332 | 5/2001 |
| WO | WO-2005/045861 | 5/2005 |

OTHER PUBLICATIONS

"Table VI. Geometric parameters obtained from crystallographic data and MM2 calculations", J. Electrochem. Soc., vol. 141, No. 12, p. 3340 (1994).

Ahlrich R. et al., "Electronic Structure Calculations on Workstation Computers: The Program System Turbomole", Chemical Physics Letters, vol. 162, No. 3, pp. 165-169 (1989).

Becke, "Density-functional exchange-energy approximation with correct asymptotic behavior", Physical Review A, vol. 38, No. 6 pp. 3098-3100 (1988).

Conway, "Electrochemical Supercapacitors, Scientific Fundamentals and Technological Applications", Kluwer Acadamic/Plenum Publishers, Chapter 14, pp. 408-409).

Eichkorn et al., "Auxiliary basis sets to approximate Coulom potentials", Chemical Physics Letters 242, pp. 283-290 (1995).

Forsyth et al., "Lithium doped N-methyl-N-ethylpyrrolidinium bis(trifluoromethanesulfonyl)amide fast-ion conducting plastic crystals", J. Mater. Chem, vol. 10, pp. 2259-2265 (2000).

Ikeda, "Material", the 13th International Seminar on Double Layer Capacitors and Similar Energy Storage Devices; Deerfield Beach, Florida (1 page).

Klamt et al, "Cosmo: A new Approach to Dieletric Screening in Solvents with Explicit Expressions for the Screening Energy and its Gradient", J. Chem. Soc. Perkin Trans. 2, pp. 799-805 (1993).

Perdew, "Density-functional approximation for the correlation energy of the inhomogeneous electron gas", Physical Review B, vol. 33, No. 12, pp. 8822-8824 (1986).

Perdew, "Erratum: Density-functional approximation for the correlation energy of the inhomogeneous electron gas", Physical Review B 33, vol. 34, No. 10, p. 7406 (1986).

Schafer et al., "Cosmo Implementation in Turbomole: Extension of an efficient quantum chemical code towards liquid systems", Phys. Chem. Chem. Phys. vol. 2, pp. 2187-2193 (2000).

Schafer et al., "Fully optimized contracted Gaussian basis sets of triple zeta valence quality for atoms Li to Kr", J. Chem. Phys., vol. 100, No. 8, pp. 5829-5835 (1994).

Schwake, "Performance of Ultracapacitors from EPCOS with acetonitrile-free electrolytes", The 13th International Seminar on Double Layer Capacitors and Similar Energy Storage Devices: pp. 1-11, Deerfield Beach, Florida (2003).

Ue et al., "Conductivities and Ion Association of Quaternary Ammonium Carboxylates in γ-Butyrolactone", vol. 61, No. 9, pp. 1080-1087 (1993).

Ue et al., "Conductivities and Ion Association of Quaternary Ammonium Tetrafluoroborates in Propylene Carbonate", Electrochemica Actra, vol. 39, No. 13, pp. 2083-2087 (1994).

Ue et al., Electrochemical Properties of Organic Liquid Electrolytes Based on Quaternary Onium Salts for Electrical Double-Layer Capacitors, J. Electrochem Soc., vol. 141, No. 11, pp. 2989-2996 (1994).

Von Arnim et al., "Performance of Parallel TURBOMOLE for Density Functional Calculations", Journal of Computational Chemistry, vol. 19, No. 15, pp. 1746-1757 (1998).

Conway, "Electrochemical Supercapacitors, Scientific Fundamentals and Technological Applications", Kluwer Acadamic/Plenum Publishers, 1999, Chapter 14, pp. 408-409.

Ikeda, "Material", the 13th International Seminar on Double Layer Capacitors and Similar Energy Storage Devices; Deerfield Beach, Florida, 2003, (1 page).

Text of first Office Action in related Chinese Application No. 200580033496.1.

* cited by examiner

ELECTROLYTE SOLUTION FOR DOUBLE-LAYERED CAPACITORS AND DOUBLE-LAYERED CAPACITOR CONTAINING SAID ELECTROLYTE SOLUTION

RELATED APPLICATIONS

This application is a national stage application (under 35 U.S.C. 371) of PCT/DE2005/001378 filed Aug. 3, 2005, which claims benefit of German application 10 2004 037 601.8 filed Aug. 3, 2004.

Electrochemical double layer capacitors are used in power electronics because they are actualisable with high capacitances combined with very low ESR. Used as temporary energy storage devices for example, double layer capacitors have to be capable of emitting or receiving high currents and hence high energies within relatively short periods measuring a few seconds or less. In order that this may be accomplished as losslessly as possible, the capacitors' electrical internal resistance has to be minimized.

An electrochemical double layer capacitor consists essentially of two electrodes, either coated with a high-surface-area electrode material or inherently having a large surface area, an example being aluminium current collectors coated with activated carbon powder or carbon cloths as electrodes. Interleaved between the two electrodes is a separator which serves to electrically insulate the two electrode layers, has a porous construction and is capable of taking up the electrolyte and which, what is more, is permeable to the electrolyte and, more particularly, to the ions which form from the conducting salt dissolved in the electrolyte. The separator is normally selected from paper, polymeric foil, felt or fabric woven from plastic material or glass fibres.

Capacitance is typically increased by stacking a plurality of electrode plies and separator layers alternatingly on top of one another, for example as a planar stack or, even simpler and more space-savingly, in the form of a roll or coil. After a stack has been formed from electrodes and separator layers, it is installed in a housing and impregnated with an electrolyte, for example an electrolyte solution.

The printed publication U.S. Pat. No. 6,535,373 B1 discloses an electrochemical double layer capacitor for use at low temperatures whose electrolyte solution contains a mixture of the conducting salts tetraethylammonium tetrafluoroborate, methyltriethylammonium tetrafluoro-borate and a pentaalkylimidazolium tetrafluoroborate. Electrolyte solutions of this kind have the disadvantage that some of their conducting salts, the tetraethylammonium tetrafluoroborate for example, have little solubility in the solvent of the electrolyte solution at low temperatures of about −30° C., so that they can only be dissolved in small amounts and, accordingly, the capacitance of double layer capacitors comprising these electrolyte solutions decreases at low temperatures and the ESR increases substantially.

It is an object of the present invention to provide an electrolyte solution of high conductivity that is improved over the electrolyte solutions mentioned above.

We have found that this object is achieved according to the present invention by an electrolyte solution having the features of claim 1. Advantageous embodiments of the electrolyte solution and also an electrochemical double layer capacitor comprising the electrolyte solution are the subject of further claims.

An electrolyte solution for double layer capacitors which is in accordance with the present invention comprises the following components:

A) at least one conducting salt containing a cation having a maximum diameter of <9.20 Å which additionally comprises substituents on the central atom which are not all the same, B) at least one solvent containing a functional group selected from lactone and nitrile.

The inventors recognised that electrolyte solutions whose conducting salts have a cation with a maximum diameter<9.20 Å are by virtue of the low cation diameter less prone to raise the viscosity of the electrolyte solutions at low temperatures than for example the cations disclosed in U.S. Pat. No. 6,535,373 B1. The cations specified therein are larger than the cations used in the electrolyte solutions of the present invention. For example, the tetraethylammonium cation disclosed there has a maximum diameter of 9.22 Å and the methyltriethylammonium cation has a maximum diameter of 9.22 Å. This is why electrolyte solutions in accordance with the present invention have a lower temperature dependence of conductivity than conventional electrolyte solutions.

Maximum diameters are calculated by quantum mechanical computation of molecular structures using density functional theory by applying the TURBOMOLE program and using the COSMO continuum salvation model. To determine the dimensions of the ions, the first step is to use a quantum chemical method of computation to determine a realistic depiction of the space which the ion in solution occupies. To this end, the three-dimensional structure of minimum energy by density functional theory (A. D. Becke, Phys. Rev. A 38 (1988) 3098; J. P. Perdew, Phys. Rev. B, 33 (Funktional B-P86); A. Schäfer, C. Huber, R. Ahlrichs, J. Chem. Phys. 100 (1994) 5829 (Basis TZVP)) using the COSMO continuum solvation model (A. Klamt, G. Schüütirmann, J. Chem. Soc. Perkin Trans. II (1993) 799; A. Schafer, A. Klamt, D. Sattel, J. C. W. Lohrenz, F. Eckert, Phys. Chem. Chem. Phys. 2 (2000) 2187; www.cosmologic.de) (atomic radii $r_H$=1.3 Å, $r_c$=2.0 Å, $r_N$=1.83 Å, dielectric constant $\in=\infty$) with the TURBOMOLE program package (R. Ahlrichs, M. Bär, M. Häser, H. Horn, C. Kölmel, Chem. Phys. Lett. 162 (1989) 165; M. v. Arnim, R. Ahlrichs; J. Comput. Chem. 19 (1998) 1746; ww.turbomole.com). This gives a depiction of the ion surface in the form of a point net. The largest and smallest diameter of this ion shell is then determined according to an algorithm known to one skilled in the art. The ion diameters thus computed can be visualised as the smallest and largest distance between two parallel walls between which the ion is pinned in all possible orientations.

The printed publications mentioned above are hereby fully incorporated herein by reference. The maximum diameters of the cations and anions can be computed particularly well and reliably in the angstrom range to the second digit after the decimal point compared for example with the effective radius in the case of elongated ions.

Since the substituents on the central atom of the cations are not all the same (as for instance with the ethyltrimethylammonium cation where there are three methyl substituents and one ethyl substituent on the central nitrogen atom), the conducting salts of electrolyte solutions of the present invention have a lower lattice energy and hence an increased solubility in lactones and nitrites than conducting salts of conventional electrolyte solutions, which frequently carry identical substituents on the central atom (as in the case of the tetraethylammonium cation for example). Conducting salts with cations whose substituents are not all the same can accordingly be dissolved in higher concentrations in the solvent, so that electrolyte solutions of the present invention can have an increased conductivity.

In one advantageous embodiment of the invention, component A) of an electrolyte solution of the present invention comprises anions having a maximum diameter≦6.80 Å. Conducting salts whose cations have a maximum diameter <9.20 Å and whose anions have a maximum diameter ≦6.80 Å are particularly useful for electrolyte solutions of high conductivity at low operating temperatures. The ionic radii of the anions can be computed according to the cations by the methods mentioned above. Anions selected from tetrafluoroborate and hexafluorophosphate make particularly advantageous anions in electrolyte solutions of the present invention. The tetrafluoroborate anion has a maximum diameter of 5.72 Å and the hexafluorophosphate anion has a maximum diameter of 6.76 Å.

Cations whose maximum diameter is <9.20 Å can be selected from: ethyltrimethylammonium, N,N-dimethyl-pyrrolidinium, diethyldimethylammonium, and N-ethyl-N-methylpyrrolidinium. The ethyltrimethylammonium cation has a maximum diameter of 8.04 Å, the N,N-dimethylpyrrolidinium cation has a maximum diameter of 7.84 Å and the N-ethyl-N-methylpyrrolidinium cation has a maximum diameter of 9.08 Å. These cations additionally have four substituents on the central atom, the nitrogen atom, which are not all the same, so that their salts have a particularly low lattice energy and hence a particularly high solubility in the lactones and nitriles of electrolyte solutions which are in accordance with the present invention.

Component B) is advantageously selected from: acetonitrile, 3-methoxypropionitrile, propionitrile, butyronitrile, γ-valerolactone and γ-butyrolactone. These solvents have a particularly low viscosity and high polarity, so that electrolyte solutions of the present invention which comprise these solvents have a high conductivity also at very low temperatures of −30° C. for example. In one embodiment of the present invention, the conducting salt dimethylpyrrolidinium tetrafluoroborate is disclaimed as component A) when γ-butyrolactone is the solvent of component B).

The present invention further provides an electro-chemical double layer capacitor comprising one of the abovementioned electrolyte solutions according to the present invention.

Such electrochemical double layer capacitors according to the present invention have the advantage that owing to the small size of the cation of the conducting salt, the cations can get particularly simply into small pores of the electrodes of the double layer capacitor, resulting in a higher capacitance for the electro-chemical double layer capacitors of the present invention. Another result due to more pores of the electrodes of the double layer capacitor being accessible to the cations is, particularly at low temperatures also, a low ESR and a high capacitance for the entire capacitor. The illustrative embodiments recited hereinbelow reveal that electrochemical double layer capacitors in accordance with the present invention have approximately a 6% to 7% higher capacitance and up to 25% lower ESR at −40° C. than conventional double layer capacitors.

Electrochemical double layer capacitors in accordance with the present invention advantageously have a porous separator between the electrodes which is impregnated with an electrolyte solution of the present invention. The electrodes in question comprise advantageously sheet-formed metals, for example metallic current collectors composed of aluminium and coated with a high-surface-area electrode material, for example activated carbon powder or carbon cloths. The high-surface-area electrode material advantageously has a surface area greater than 1000 m$^2$/g or a surface area between 1000 m$^2$/g to 2500 m$^2$/g. The surface areas of these materials can be calculated for example by means of the Brunauer, Emmett and Teller isotherm, the BET isotherm, in a known manner by means of gas adsorption.

The inventors recognized that it is advantageous when a particularly large proportion of the surface area of the electrode material is accounted for by pores having a pore size <10 Å. The electrode materials should advantageously be formed such that the pores having a pore size<10 Å contribute more than 50% and preferably more than 90% of the entire surface area of the electrode material. The surface area of the electrode material in electrode materials of this kind is advantageously more than 1500 m$^2$/g and preferably about 1800 m$^2$/g. The inventors recognized that electrode materials having such large surface areas and such a high proportion of pores having a pore size<10 Å are particularly useful for electrolyte solutions which are in accordance with the present invention. The pores of such electrode materials are particularly readily accessible by present invention electrolyte solutions comprising the small cations. In the case of conventional double layer capacitors, whose electrolyte solutions comprise cations having larger maximum diameters, for example the tetraethylammonium cation, these micropores are frequently not so available for the capacitor effect, so that use of these conventional electrolyte solutions in double layer capacitors results in lower conductivities for the electrolyte solutions in the pores and larger ESR and also lower capacitances.

The distribution of the pore size of an activated carbon can be calculated for example from BET isotherms at high partial fractions from the Kelvin equation, the hysteresis in the absorption/desorption curves, the isotherms. Such calculations are described for example in the paper "Reporting Physisorption Data for Gas/Solid Systems", Pure and Applied Chemistry, Volume 57, page 603, 1985, which is hereby fully incorporated herein by reference.

Metallic foils coated with a carbon powder or with a carbon cloth having an internal surface area greater than 1000 m$^2$/g and a micro- to mesopore ratio between 100:0 and 50:50 are particularly advantageous for use as electrodes. Micropores are defined as pore sizes<20 Å and mesopores as pore sizes between 20 and 500 Å. The ratio indicates which proportion of the overall surface area of the carbon is accounted for by micropores and mesopores. Double layer capacitors in accordance with the present invention more preferably utilise activated carbons having a surface area>2000 m$^2$/g and a micro- to mesopore ratio>90:10.

The invention will now be more particularly described with reference to illustrative embodiments and figures.

Table 1 shows a comparison of the conductivity of various inventive and conventional electrolyte solutions.

Table 2 reports the precipitation behaviour of various conducting salts in solvents at −40° C.

Table 3 shows the electrical properties of various double layer capacitors comprising inventive and conventional electrolyte solutions at 25° C.

TABLE 1

Conductivities of various electrolyte solutions in mS/cm [25° C.]

| Conductivity mS/cm [25° C.] Conducting | Concentration of conducting salt | | | |
|---|---|---|---|---|
| salt/solvent | 0.9 M | 1 M | 1.5 M | 2 M |
| Et$_4$NBF$_4$/ acetonitrile | 54 | 57 | 64 | not completely soluble |
| EtMe$_3$NBF$_4$/ acetonitrile | 49 | 50.9 | 59.7 | 63.8 |
| EtMePNBF$_4$/ acetonitrile | not determined | 55.5 | 64.5 | 67.8 |
| Et$_4$NBF$_4$/PC | 13.6 | 14.0 | not completely soluble | not completely soluble |
| EtMe$_3$NBF$_4$/γ-B. | not determined | not determined | 20.8 | 22.5 |

Abbreviations: EtMePNBF$_4$ = N-ethyl-N-methyl-pyrrolidinium tetrafluoroborate; γ-B. = γ-butyrolactone; PC = propylene carbonate Table 1 shows the conductivities of a conventional electrolyte solution comprising tetraethylammonium tetrafluoroborate in acetonitrile and tetra-ethylammonium tetrafluoroborate in propylene carbonate versus the conductivities of inventive electrolyte solutions in dependence on various concentrations of conducting salt. The table reveals that when conducting salt concentrations are the same, inventive electrolyte solutions have approximately the same or only minimally worse conductivity than the conventional electrolyte solution based on tetraethylammonium tetrafluoroborate, although admittedly conducting salts used according to the present invention can by virtue of their lower lattice energies as well as other reasons be dissolved in higher concentrations in the solvent, as described above.

Specifically, not only ethyltrimethylammonium tetra-fluoroborate but also ethylmethylpyrrolidinium tetra-fluoroborate is still soluble in acetonitrile in concentrations of 2 mol/l, whereas the traditionally used tetraethylammonium tetrafluoroborate is no longer soluble in acetonitrile. The inventive electrolyte solution comprising ethyltrimethylammonium tetrafluoro-borate in γ-butyrolactone has a lower conductivity than the conventional electrolyte comprising acetonitrile, but, first, has the advantage that the conducting salt dissolves in higher concentrations in γ-butyrolactone and, secondly, shows significant advantages over conventional electrolyte solutions comprising propylene carbonate (see also FIGS. 6 and 7).

TABLE 2

Precipitation behaviour of conducting salts in various electrolyte solutions at −40° C.

| Precipitation at −40° C. Conducting | Concentration of conducting salt | | | |
|---|---|---|---|---|
| salt/solvent | 0.9 M | 1 M | 1.5 M | 2 M |
| Et$_4$NBF$_4$/ acetonitrile | no | yes | yes | frozen |
| EtMe$_3$NBF$_4$/ acetonitrile | no | no | no | frozen |
| EtMePNBF$_4$/ acetonitrile | not measured | no | no | no |
| Et$_4$NBF$_4$/PC | yes | yes | frozen | frozen |
| EtMe$_3$NBF$_4$/γ-B. | no | no | no | no |

Abbreviations: EtMePNBF$_4$ = N-ethyl-N-methyl-pyrrolidinium tetrafluoroborate; γ-B. = γ-butyrolactone; PC = propylene carbonate Table 2 shows the precipitation behaviour of conducting salts of various electrolyte solutions at −40° C. as a function of the concentration of conducting salt. The state of the art in electrolyte solutions is represented by an electrolyte solution comprising tetraethylammonium tetrafluoroborate in acetonitrile and tetraethylammonium tetrafluoroborate in propylene carbonate. As in Table 1, ethyltrimethylammonium tetrafluoroborate or N-ethyl-N-methylpyrrolidinium tetrafluoroborate in acetonitrile and ethyltrimethylammonium tetrafluoroborate in γ-butyrolactone are listed as inventive comparative examples. The table reveals that conducting salts used according to the present invention are soluble in acetonitrile at −40° C. up to concentrations of 1.5 mol per litre at least, without the conducting salt precipitating. The traditionally used tetraethylammonium tetrafluoroborate is only soluble at −40° C. in a concentration of 0.9 mol/l without precipitation. Higher concentrations cause either a precipitation of the conducting salt in the solvent or even cause the electrolyte solution to freeze. Particularly good precipitation behaviour is displayed by N-ethyl-N-methylpyrrolidinium tetrafluoroborate in acetonitrile and ethyltrimethylammonium tetrafluoroborate in γ-butyrolactone, which at −40° C. are even soluble up to a concentration of 2 mol/l. It is therefore absolutely clear from this table that inventive electrolyte solutions have advantages over conventional electrolyte solutions with regard to solubility at low temperatures in particular.

TABLE 3

Electrical properties of double layer capacitors at 25° C.

| Electrolyte solution | ESR [10 mHz/mΩ] | Cap. [10 mHz/F] | ESR [50 mHz/mΩ] | Cap. [50 mHz/F] | ESR [100 mHz/mΩ] |
|---|---|---|---|---|---|
| 0.9 M Et$_4$NBF$_4$/AN | 3.6 | 243.2 | 3.1 | 228.2 | 1.1 |
| 0.9 M EtMe$_3$NBF$_4$/AN | 4.0 | 252.3 | 3.5 | 236.7 | 1.4 |
| 1.5 M EtMePNBF$_4$/AN | 3.5 | 265.5 | 2.9 | 248.9 | 1.0 |
| 0.69 M Et$_4$NBF$_4$/PC | 38.6 | 213 | 27.7 | 127.3 | 4.5 |
| 2 M EtMe$_3$NBF$_4$/γ-B. | 17.4 | 246 | 10.2 | 214.4 | 2.5 |

Abbreviations: EtMePNBF$_4$ = N-ethyl-N-methyl-pyrrolidinium tetrafluoroborate; AN = acetonitrile; Cap. = capacitance; F = farad; γ-B. = γ-butyrolactone; PC = propylene carbonate Table 3 shows the electrical properties, the ESR and the capacitance of conventional and of inventive double layer capacitors at 25° C. at various frequencies 10 mHz, 50 mHz and 100 mHz. The electrolyte solutions in the conventional and inventive double layer capacitors each utilized the salts mentioned above in Tables 1 and 2 in a concentration of 0.9, 0.69 or 1.5 mol/l respectively. It is clear from Table 3 that double layer capacitors comprising inventive electrolyte solutions have comparable ESR values and up to 9% higher capacitances than double layer capacitors comprising conventional electrolyte solutions. Inventive double layer capacitors whose electrolyte solutions comprise N-ethyl-N-methylpyrrolidinium tetrafluoroborate in acetonitrile in a concentration of 1.5 mol/l even show improved electrical properties over a conventional double layer capacitor comprising tetraethylammonium tetrafluoroborate in acetonitrile with regard to ESR.

The inventive double layer capacitor comprising ethyltrimethylammonium tetrafluoroborate in γ-butyrolactone likewise shows improved electrical properties over a conventional double layer capacitor comprising tetraethylammonium tetrafluoroborate in propylene carbonate. More particularly, the capacitance at 50 mHz is significantly higher with the inventive γ-butyrolactone electrolyte solution than with the conventional electrolyte solution comprising tetra-ethylammonium tetrafluoroborate in propylene carbonate. Thus, inventive double layer capacitors exhibit at 25° C. similar or even improved electrical properties.

Figure 1:
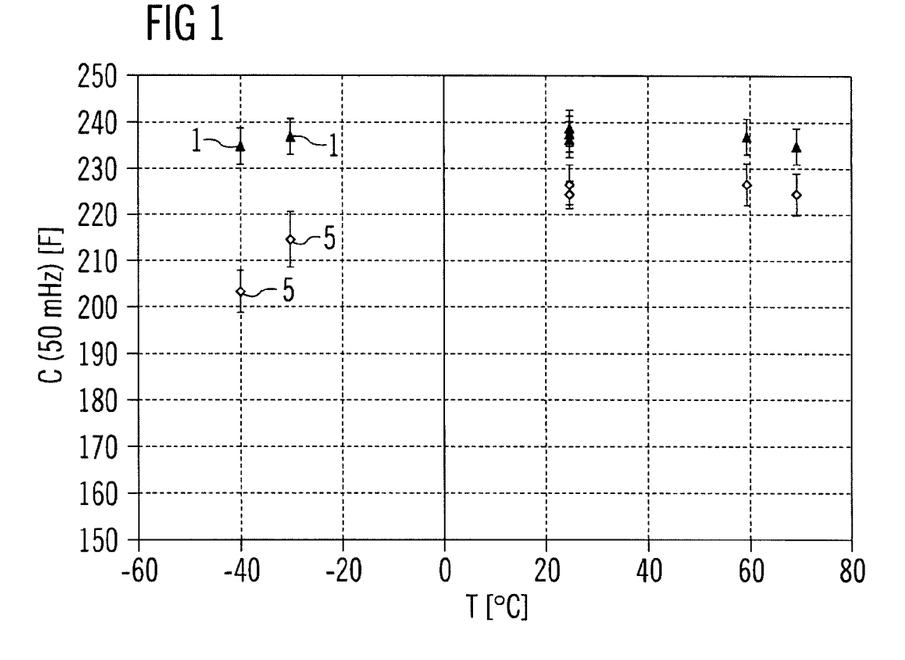
FIGS. 1 to 7 show diagrams in which the electric properties of conventional double layer capacitors are compared with those of inventive capacitors.

FIG. 1 shows the capacitance in farad at a frequency of 50 mHz versus the temperature in ° C. for a conventional double layer capacitor whose electrolyte solution consists of 0.9 mol/l of tetraethylammonium tetrafluoroborate in acetonitrile (the measurements labelled 5) and for an inventive electrolytic capacitor whose electrolyte solution consists of 0.9 mol/l of ethyltrimethylammonium tetrafluoroborate in aceto-nitrile (the measurements designated 1). Particularly at temperatures below −20° C., the inventive double layer capacitor has distinctly higher capacitances than the conventional double layer capacitor.

Figure 2:
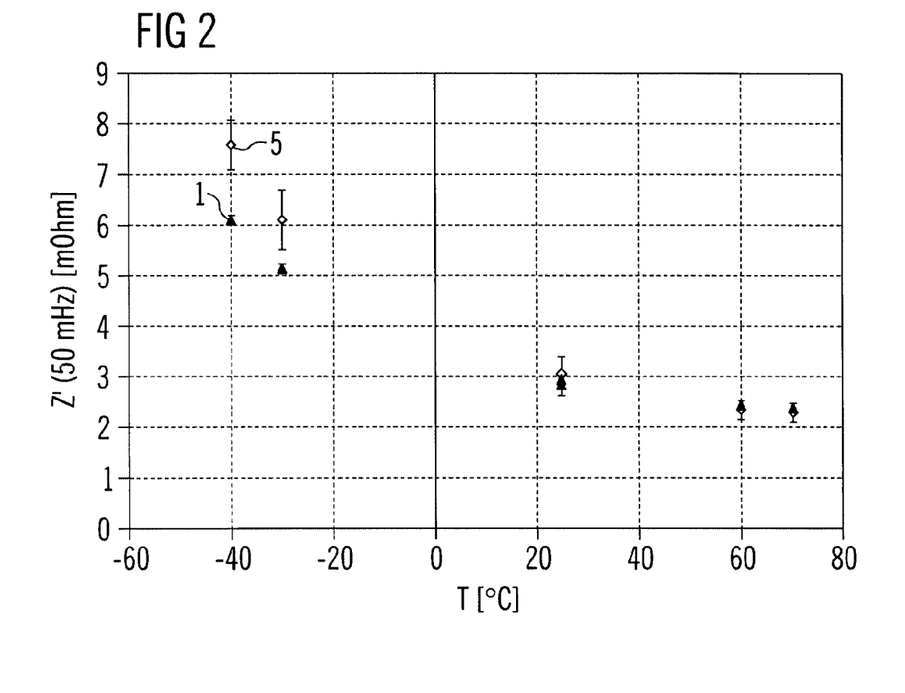

FIG. 2 shows the ESR values Z' at a frequency of 50 mHz in mΩ for the double layer capacitors already used in FIG. 1. The inventive double layer capacitor has ESR values at temperatures above 20° C. which are comparable to the conventional double layer capacitor. At temperatures below −20° C., the inventive double layer capacitor has ESR values which are advantageously lower than those of the conventional double layer capacitor. Thus, inventive double layer capacitors have particularly at low temperatures higher energy densities ($P=U^2/4$ ESR). This is of huge significance for automotive applications in particular.

Figure 3:
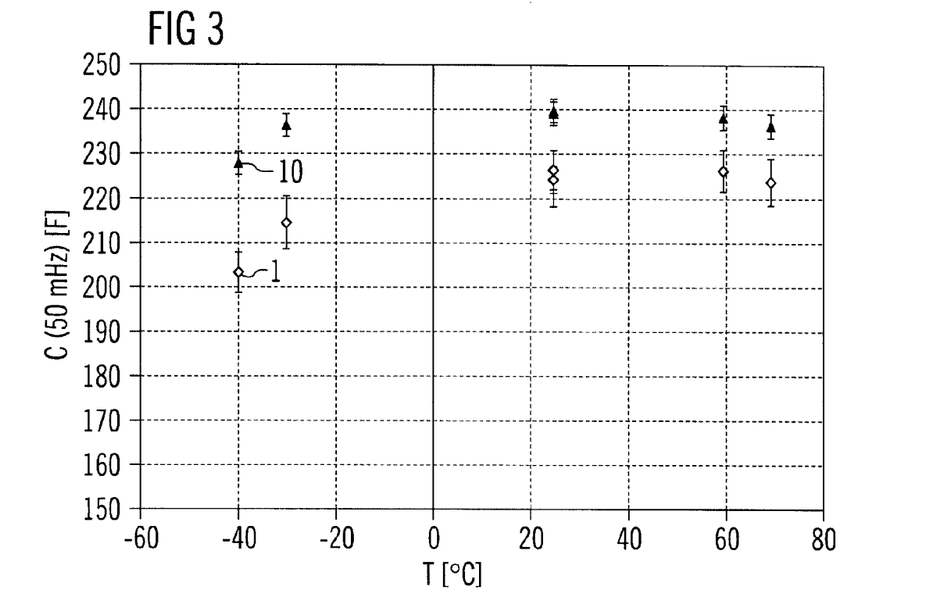

FIG. 3 plots the capacitances in farads at a frequency of 50 mHz versus the temperature in degrees Celsius for a conventional and an inventive double layer capacitor. The measurements designated 1 indicate the capacitances of a conventional double layer capacitor whose electrolyte solution has the same composition as the conventional double layer capacitors used in FIGS. 1 and 2. The measurements marked 10 indicate the capacitance of an inventive double layer capacitor whose electrolyte solution consists of 1.5 mol/l of N-ethyl-N-methylpyrrolidinium tetrafluoroborate in acetonitrile. The inventive double layer capacitor exhibits consistently better capacitances than the conventional double layer capacitor over a wide temperature range from −40 to +70° C.

Figure 4:
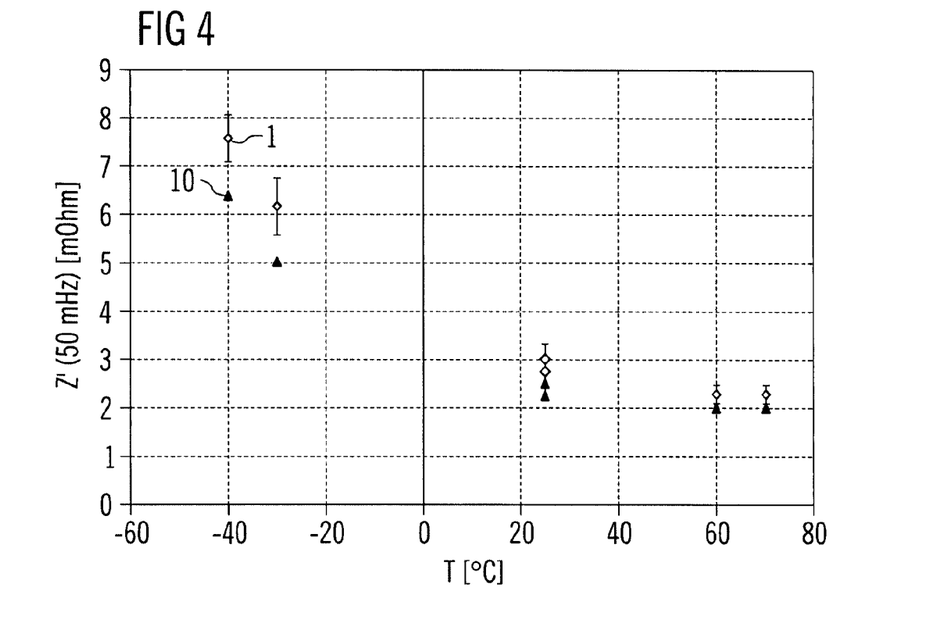

FIG. 4 shows the ESR Z' at a frequency of 50 mHz versus temperature for the double layer capacitors already recited in FIG. 3. The inventive double layer capacitor has smaller ESR values at low temperatures >−20° C. in particular than the conventional double layer capacitor.

Figure 5:
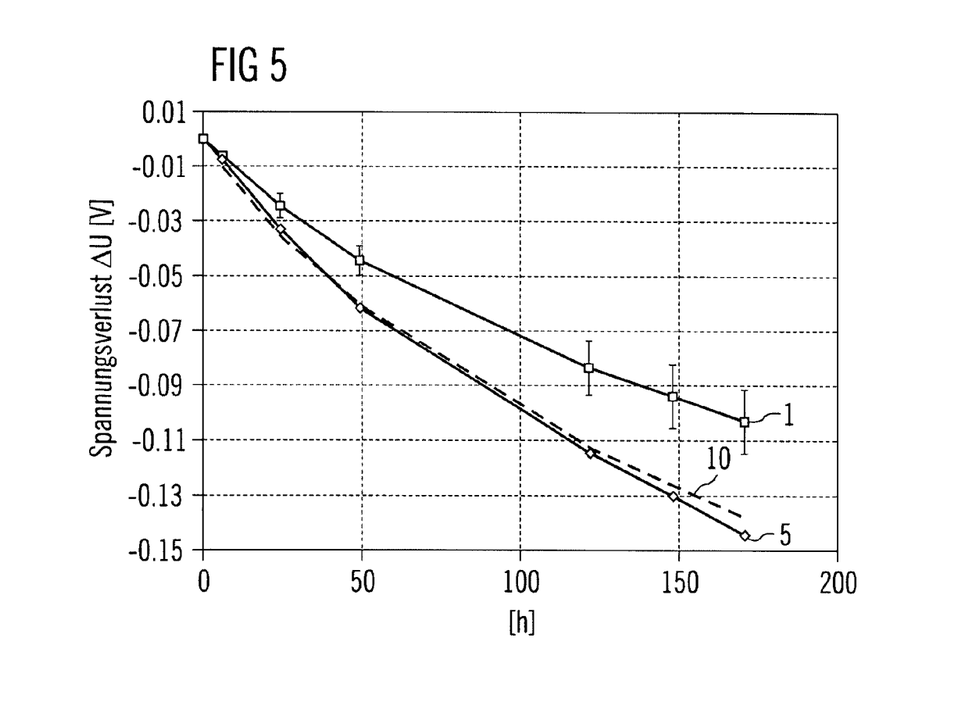

FIG. 5 shows the self-discharge behaviour of a conventional double layer capacitor in comparison with inventive double layer capacitors at 25° C. The charging voltage was 2.5 V for all capacitors over a charging time of 24 h. The voltage loss in volts was plotted versus the time in hours. The curves marked with the reference numerals 1, 5 and 10 indicate the self-discharge of double layer capacitors whose electrolyte solutions have the same composition as the double layer capacitors which, in FIGS. 1 to 4, are assigned to the measurements bearing the same reference numerals. Compared with the conventional double layer capacitor comprising tetraethylammonium tetrafluoroborate in acetonitrile (reference numeral 5), particularly the inventive double layer capacitor whose electrolyte solution consists of 0.9 mol/l of ethyltrimethyl-ammonium tetrafluoroborate in acetonitrile (reference numeral 1) exhibits distinctly improved self-discharge behaviour.

Figure 6:
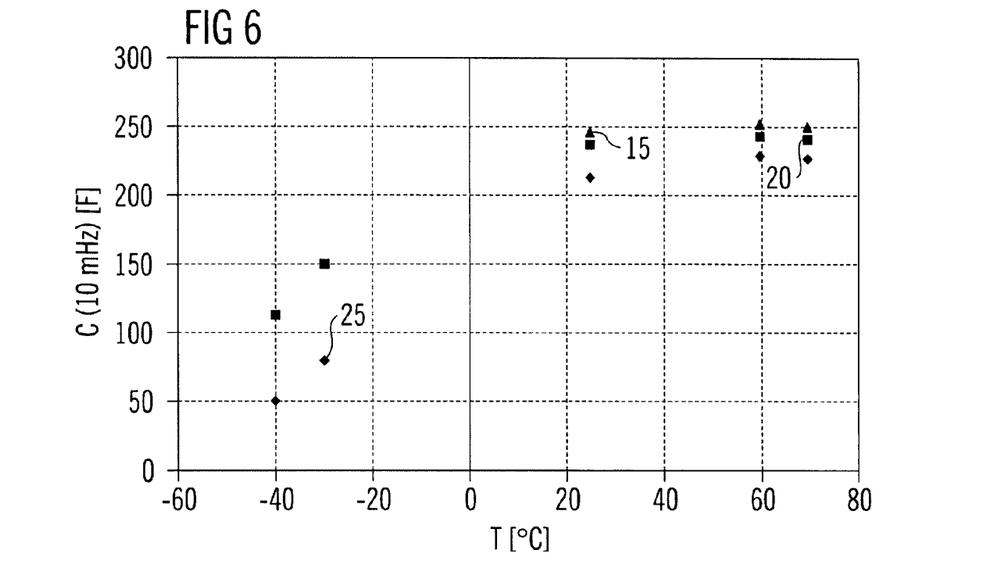

FIG. 6 plots the capacitance in farad at a frequency of 10 mHz versus the temperature in ° C. for an inventive double layer capacitor comprising 2 M ethyl-trimethylammonium tetrafluoroborate in γ-butyrolactone (reference numeral 15) against two conventional double layer capacitors comprising 2 M triethylmethylammonium tetrafluoroborate in γ-butyrolactone (reference numeral 20) and 0.69 M tetraethylammonium tetrafluoroborate in propylene carbonate (reference numeral 25). The inventive double layer capacitor exhibits higher or comparable capacitances compared with conventional double layer capacitors at above room temperature.

Figure 7:
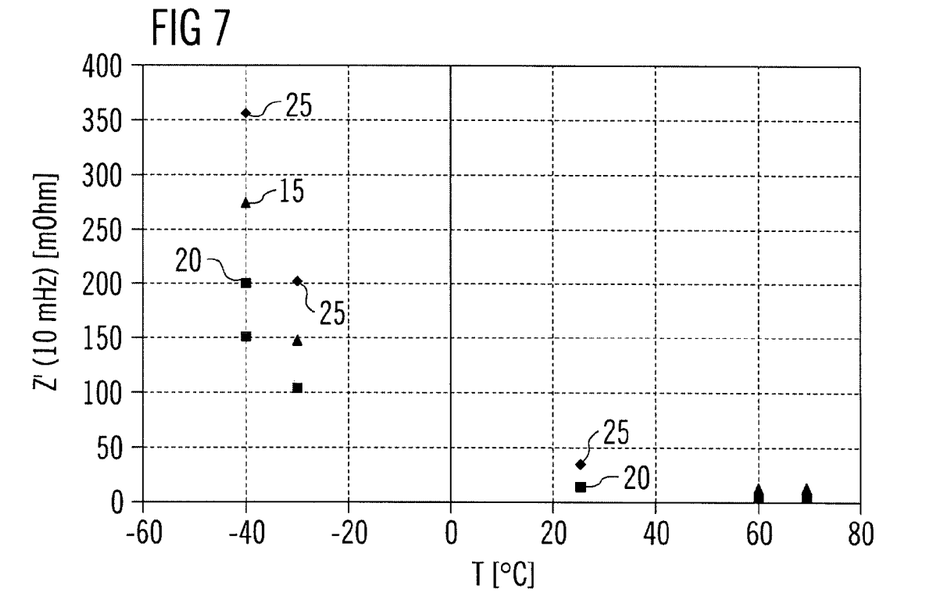

FIG. 7 depicts ESR versus temperature in ° C. at 10 mHz for the double layer capacitors already shown in FIG. 6. The inventive double layer capacitor exhibits comparable or even improved ESR values compared with conventional double layer capacitors at above room temperature.

Inventive electrolyte solutions and double layer capacitors can by virtue of their advantageous properties be used at temperatures between −50° C. to 125° C., preferably −40° C. to 85° C. and more preferably at −35° C. to 70° C. The inventive double layer capacitors can be used with particular advantage in applications where the capacitor has to take up large currents at very low temperatures, for example in automobiles, for example in the ignition device, or at engine start or for recuperation in hybrid vehicles.

The present invention is not restricted to the illustrative embodiments depicted here. Further variations are particularly possible in relation to the concentration of the already specified conducting salts used according to the present invention but also in relation to further cations and anions having the advantageous ionic radii specified.

The invention claimed is:

1. An electrolyte solution for double layer capacitors, comprising the following components:
   A) at least one conducting salt containing a cation which is selected from the group consisting of N,N-dimethylpyrrolidinium, diethyldimethylammonium and N-ethyl-N-methylpyrrolidinium,
   B) at least one solvent containing a functional group selected from lactone and nitrile.

2. The electrolyte solution according to claim 1, wherein component A) comprises anions having a maximum diameter≦6.80 Å.

3. The electrolyte solution according to claim 2, wherein the anions comprise B or P as a central atom.

4. The electrolyte solution according to claim 3, wherein the anions are $BF_4^-$ or $PF_6^-$.

5. The electrolyte solution according to claim 1, wherein component B) is acetonitrile, 3-methoxypropionitrile, propionitrile, butyronitrile, γ-valerolactone or γ-butyrolactone.

6. The electrolyte solution according to claim 1, wherein component A) is present in a concentration between 0.5 and 3 mol/l.

7. The electrolyte solution according to claim 1, wherein component A) is present in a concentration between 0.8 and 2.1 mol/l.

8. The electrolyte solution according to claim 1, wherein component A) comprises N-ethyl-N-methylpyrrolidinium tetrafluoroborate in a concentration of 0.9 to 2 mol/l, and wherein component B) comprises acetonitrile.

9. An electrolyte solution for double layer capacitors, comprising component A) comprises ethyl-trimethylammonium tetrafluoroborate in a concentration of 0.9 to 2 mol/l, and wherein component B) comprises acetonitrile.

10. An electrochemical double layer capacitor wherein the two electrodes corn rise sheet-formed metals coated with an electrode material having a large surface area of more that 1500 $m^2/g$ and comprising pores having a pore size<10 Å which contribute more than 50% of the entire surface area of the electrode material and containing an electrolyte solution comprising the following components:
   A) at least one conducting salt containing a cation having a maximum diameter of <9.20 Å and which additionally comprises substituents on the central atom which are not all the same,
   B) at least one solvent containing a functional group selected from lactone and nitrile.

11. The double layer capacitor according to claim 10, comprising two electrodes and an interleaved porous separator impregnated with the electrolyte solution.

12. The double layer capacitor according to claim 10, wherein the surface area of the electrode material is >1800 $m^2/g$ and the proportion of the entire surface area which is accounted for by pores having a pore size<10 Å is >90%.

13. The double layer capacitor according to claim 10, comprising two metallic foils as electrodes that are coated with a carbon powder or with a carbon cloth.

14. The double layer capacitor according to claim 10, which further comprises a separator wherein said separator comprises polymeric films, nonwovens, felts, wovens composed of polymers or fiberglass or papers.

15. A process of operating the double capacitor as claimed in claim 10, which comprises operating the capacitor at temperatures between −50° C. to 125° C.

16. An electrolyte solution for double layer capacitors, comprising the following components:
   A) at least one conducting salt containing a cation having a maximum diameter of <9.20 Å which additionally comprises substituents on the central atom which are not all the same,
   B) at least one solvent containing a functional group being a lactone.

17. The electrolyte solution according to claim 16, wherein component A) comprises ethyltrimethylammonium tetrafluoroborate in a concentration of 0.9 to 2 mol/l, and wherein component B) comprises γ-butyrolactone.

18. The electrolyte solution as claimed in claim 16, wherein the cation selected from the group consisting of N,N-dimethylpyrrolidinium, diethyldimethylammonium and N-ethyl-N-methylpyrrolidinium.

19. An electrochemical double layer capacitor containing an electrolyte solution comprising the following components:
   A) at least one conducting salt containing a cation which is selected from: N,N-dimethylpyrrolidinium, diethyldimethylammonium and N-ethyl-N-methylpyrrolidinium,
   B) at least one solvent containing a functional group selected from lactone and nitrile.

20. An electrochemical double layer capacitor containing an electrolyte solution comprising the following components:
   A) at least one conducting salt containing a cation having a maximum diameter of <9.20 Å which additionally comprises substituents on the central atom which are not all the same,
   B) at least one solvent containing a functional group being a lactone.

* * * * *

UNITED STATES PATENT AND TRADEMARK OFFICE
CERTIFICATE OF CORRECTION

PATENT NO. : 7,719,820 B2
APPLICATION NO. : 11/659138
DATED : May 18, 2010
INVENTOR(S) : Hans-Georg Degen et al.

Page 1 of 1

It is certified that error appears in the above-identified patent and that said Letters Patent is hereby corrected as shown below:

In Claim 10, line 2 (column 10, line 2) delete "corn rise" and insert --comprise--.

Signed and Sealed this

Fourteenth Day of December, 2010

David J. Kappos
*Director of the United States Patent and Trademark Office*